(12) United States Patent
Baker et al.

(10) Patent No.: US 7,150,656 B1
(45) Date of Patent: Dec. 19, 2006

(54) DIGITAL SWITCHING CROSS-CONNECT MODULE

(75) Inventors: Scott K. Baker, Richfield, MN (US); Cyle D. Petersen, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/241,786

(22) Filed: Sep. 30, 2005

(51) Int. Cl.
*H01R 24/04* (2006.01)

(52) U.S. Cl. ..................................... 439/668
(58) Field of Classification Search ............... 439/668, 439/669, 581, 578, 582
See application file for complete search history.

(56) References Cited

U.S. PATENT DOCUMENTS

| | | | |
|---|---|---|---|
| 3,474,385 A * | 10/1969 | Cefarelli et al. ............ 439/295 |
| 4,815,104 A | 3/1989 | Williams et al. | |
| 5,092,784 A * | 3/1992 | de Mendez et al. ........ 439/161 |
| 5,209,678 A | 5/1993 | Allen et al. | |
| 5,233,501 A | 8/1993 | Allen et al. | |
| 5,546,282 A | 8/1996 | Hill et al. | |
| 5,737,309 A | 4/1998 | Ewell et al. | |
| 5,744,934 A * | 4/1998 | Wu .......................... 320/111 |
| 5,913,701 A | 6/1999 | Olson et al. | |
| 6,729,910 B1 * | 5/2004 | Fuller ........................ 439/668 |
| 6,743,032 B1 | 6/2004 | Ogren et al. | |

* cited by examiner

*Primary Examiner*—Phuong Dinh
(74) *Attorney, Agent, or Firm*—Merchant & Gould P.C.

(57) ABSTRACT

A cross-connect module is disclosed herein. The cross-connect module includes a housing having a front end and a rear end. The rear end includes a printed circuit board mounted to the module. First and second switching jacks positioned adjacent the front end of the housing. A DIN type rear connector is mechanically mounted to the printed circuit board. The switching jacks are routed to the DIN type rear connector via coaxial cables that are terminated to the connector. The printed circuit board is used to route a tracer lamp circuit of the module to power and ground through the DIN type rear connector.

20 Claims, 8 Drawing Sheets

DIGITAL SWITCHING CROSS-CONNECT MODULE

TECHNICAL FIELD

The present invention relates generally to digital cross-connect (DSX) equipment. More particularly, the present invention relates to cross-connect switching modules for use in telecommunications, data and video transmissions.

BACKGROUND

In the telecommunications industry, the use of switching jacks to perform cross-connect and monitoring functions is well known. The jacks may be mounted to replaceable cards or modules, which in turn may be mounted in a chassis, and multiple chassis may be mounted together in an equipment rack. Modules for use in co-axial environments are described in U.S. Pat. No. 5,913,701, which is incorporated herein by reference. Modules for use in twisted pair applications are described in U.S. Pat. No. 6,116,961. Cross-connect modules are also used with fiber optic communications systems.

Figure 1:
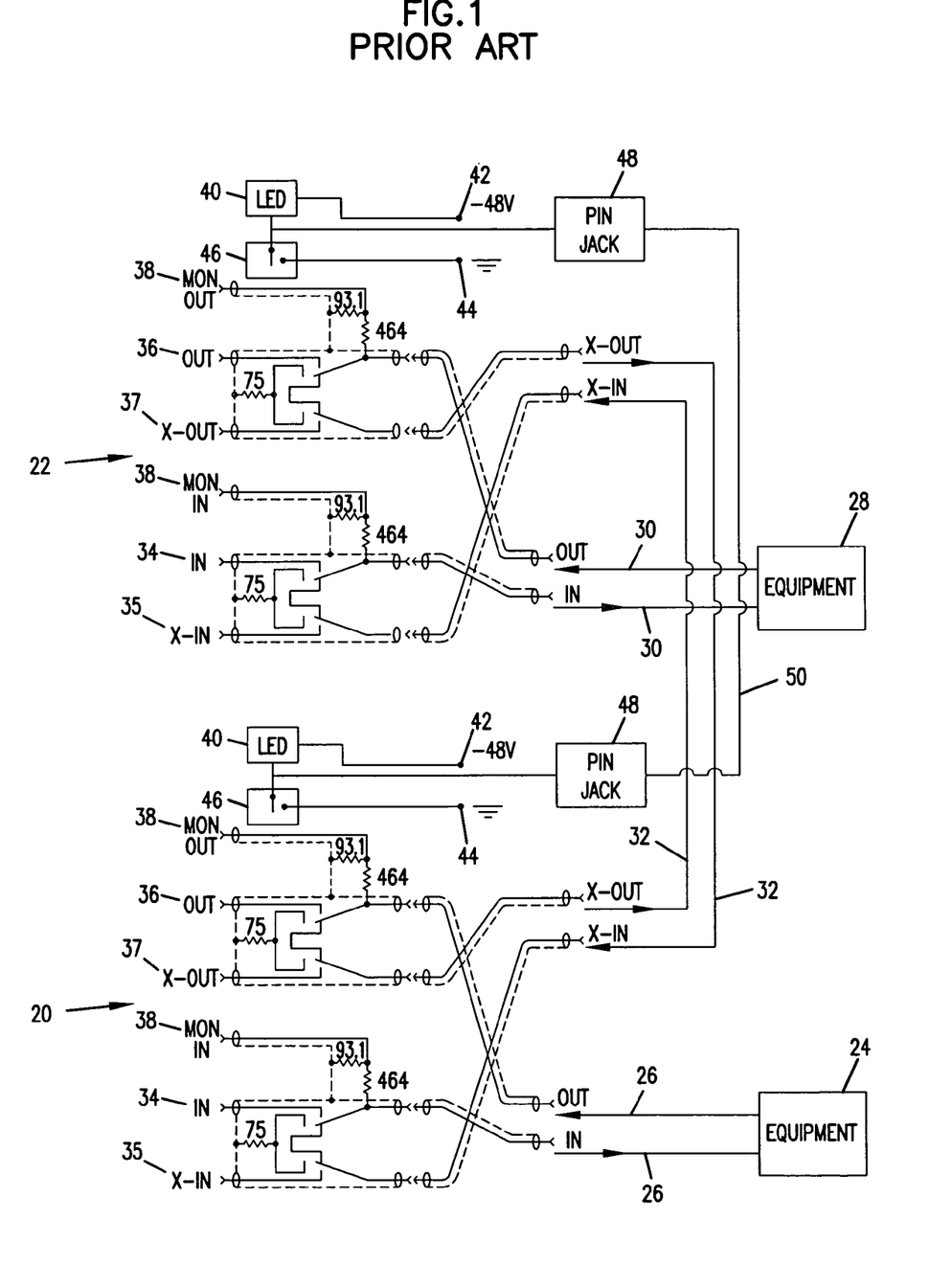
FIG. 1 shows a prior art cross-connect arrangement.

FIG. 1 shows a prior art cross-connect arrangement of the type used for co-axial applications. The depicted arrangement includes two jack modules 20, 22. The jack modules 20, 22 may be mounted in separate chassis that are in turn mounted on separate racks. Each jack module 20, 22 is cabled to a separate network element (i.e., piece of telecommunications equipment). For example, jack module 20 is connected to equipment 24 by cables 26, and jack module 22 is connected to equipment 28 by cables 30. The pieces of equipment 24 and 28 are interconnected by cross-connect jumpers 32 placed between the two jack modules 20 and 22. Each jack module 20, 22 includes IN and OUT ports 34 and 36 for direct access to the equipment's input and output signals. Each module 20, 22 also includes X-IN and X-OUT ports 35, 37 for providing direct access to the cross-connect input and cross-connect output signals. Ports 34–37 provide a means to temporarily break the connection between the pieces of equipment 24 and 28 that are cross-connected together, and to allow access to the signals for test and patching operations. The jack modules 20, 22 also include monitor ports 38 for non-intrusive access to the input and output signals of each piece of telecommunications equipment 24, 28.

SUMMARY

The present disclosure describes representative embodiments that include examples of how a number of different inventive aspects can be practiced. It will be appreciated that the inventive aspects can be used together or separately from one another. It will further be appreciated that the examples embodying the inventive aspects are merely illustrative, and that variations can be made with respect to the depicted examples without departing from the broad scope of the inventive aspects.

One inventive aspect of the disclosure relates to a DSX system having a jack module wherein front switching devices of the module are connected to a DIN-type rear connector with co-axial cables.

Another inventive aspect relates to a method for terminating a co-axial cable to a DIN-type connector.

BRIEF DESCRIPTION OF THE DRAWINGS

The accompanying drawings, which are incorporated in and constitute a part of the specification, illustrate various embodiments that are examples of how certain inventive aspects can be put into practice. A brief description of the drawings is as follows.

DETAILED DESCRIPTION

Figure 2:
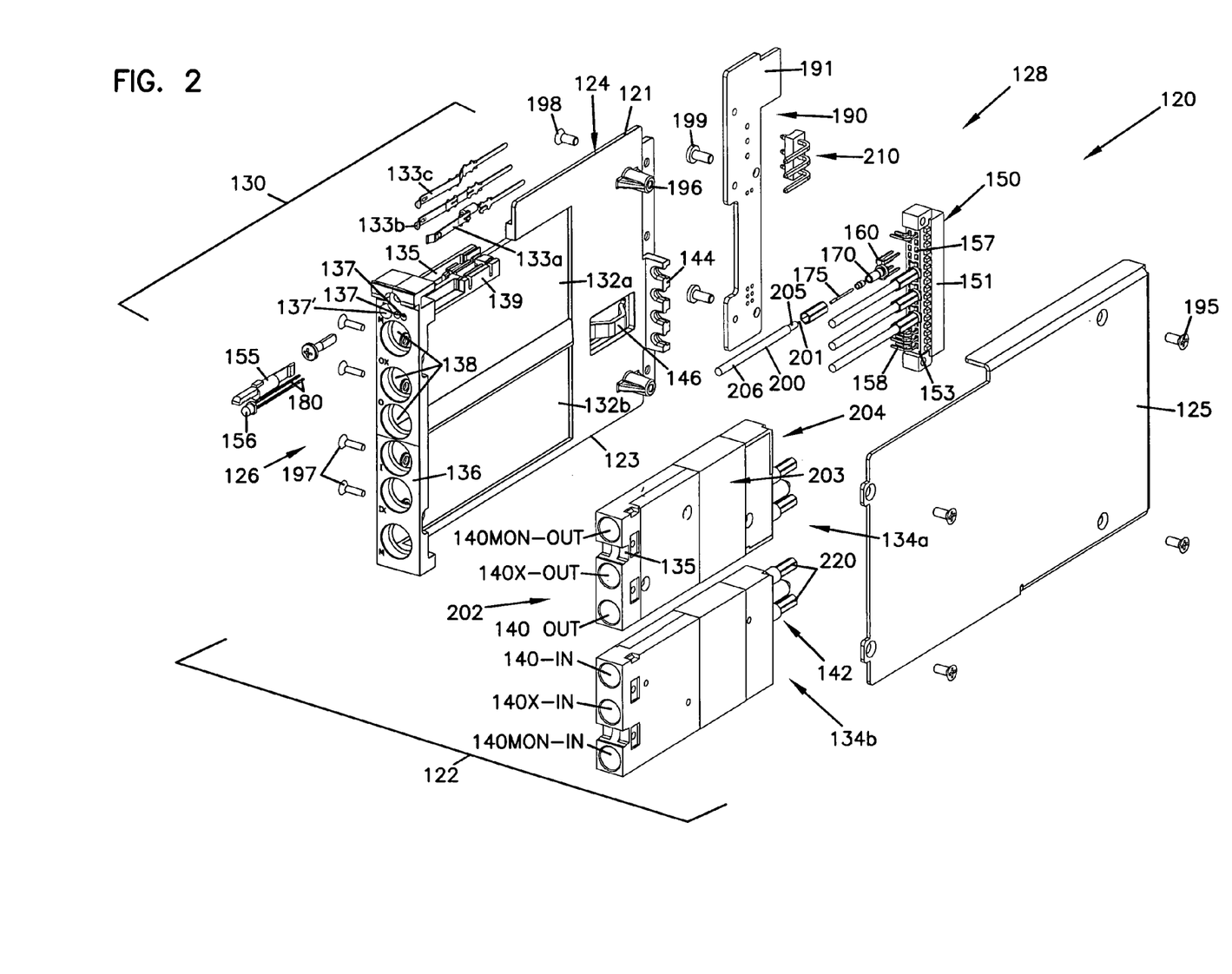
FIG. 2 illustrates an exploded view of a cross-connect module including examples of how various inventive aspects can be practiced.

FIG. 2 illustrates an exploded view of a jack module 120 including examples of how numerous inventive aspects can be practiced. The jack module 120 includes a housing 122 having a main frame 124 and a cover 125. The main frame 124 includes a front end 126 positioned opposite from a rear end 128. A printed circuit board 190 (i.e., PCB) is mounted at the rear end 128 of the main frame 124. As will be discussed in further detail below, the circuit board provides two functions. First, the circuit board provides mechanical support for a rear connector 150 (e.g., Eurocard right angle connector or DIN connector) that is mounted adjacent the rear end 128 of the main frame 124. Second, the circuit board 190 is used to electrically connect tracer light circuitry 130 of the module 120 to a card edge connector 191. In alternative embodiments, the circuit board 190 can electrically connect the tracer light circuitry 130 to the connector 150 and/or can be used to route power to the connector 150.

The main frame 124 of the module 120 includes pockets 132a, 132b for respectively receiving jack devices 134a, 134b (e.g., jacks as disclosed in U.S. Pat. No. 5,885,096, assigned to ADC Telecommunications, Inc., which is hereby incorporated by reference in its entirety). The front end 126 of the main frame 124 defines a front face 136. The front face 136 defines connector openings 138 corresponding to connector ports 140MON-OUT, 140X-OUT, and 140OUT (collectively referred to with reference number 140) of jack device 134a and connector ports 140IN, 140X-IN, and 140MON-IN (also collectively referred to with reference number 140) of jack device 134b, respectively.

The jack devices 134*a*, 134*b* are electrically connected to the rear connector 150 via co-axial cables 200, as will be described in further detail below. The jack devices 134*a*, 134*b* are not terminated to the printed circuit board, and no digital signals are routed through the printed circuit board. Instead, in each embodiment of the module described herein, the digital signals are routed through the co-axial cables 200 directly from the jacks 134*a*, 134*b* to the DIN-type rear connector 150.

Still referring to FIG. 2, the front face 136 of the main frame 124 is adapted for mounting various components of the tracer lamp circuitry. For example, the front face defines openings 137 for receiving leads of light emitting diode (LED) 156, and an opening 137' for receiving a tracer lamp switch 155. As shown schematically at FIG. 8, the tracer lamp circuitry is wired to a PCB connector 210 terminated to the circuit board 190. Tracings of the circuit board 190 electrically connect the PCB connector 210 to the connector 191.

I. Description of Example Module Frame

Referring to FIGS. 2–7, the jack module 120 includes a housing 122 generally made up of a main frame 124 and a removable cover 125. The cover 125 is mounted to the main frame 124 via fasteners 195 that are received within fastener mounts 196 defined on the main frame 124. The cover 125 provides an enclosure for the electrical components of the module 120. The top and bottom edges 121, 123 of the frame may act as guides that are adapted to ride within tracks or grooves defined by a chassis 300, shown schematically at FIG. 8, adapted to hold a plurality of modules 120.

Before the cover 125 is coupled to the main frame 124, jack devices 134*a*, 134*b* are received within pockets 132*a*, 132*b*, respectively. The jack devices 134*a*, 134*b* are secured to the main frame 124 via fasteners 197. When mounted, the connector ports 140 of the jack devices 134*a*, 134*b* align with the openings 138 defined in the front face 136 of the main frame 124.

As discussed previously, a printed circuit board 190 is mounted to the rear end 128 of the main frame 124 via fasteners 198. The rear connector 150 is fastened to the printed circuit board via fasteners 199.

Cables 200 provide the electrical connection between the jack devices 134*a*, 134*b* and the rear connector 150. Although the cables 200 are depicted as co-axial cables, other types of cables may be used within the module 120. The main frame 124 also includes cable management structures for organizing the cables 200 in the region between the front jacks 134*a*, 134*b* and the rear connector 150. For example, a cable guide 146 (i.e., cable tie-down structure) is defined on the main frame 124 to organize the cables 200 within the module. There are also cable retainers 144 defined adjacent the rear end 128 of the main frame 124 for aligning the cables 200 with the rear connector 150 and securing the termination.

II. Switching Assemblies

Figure 3:
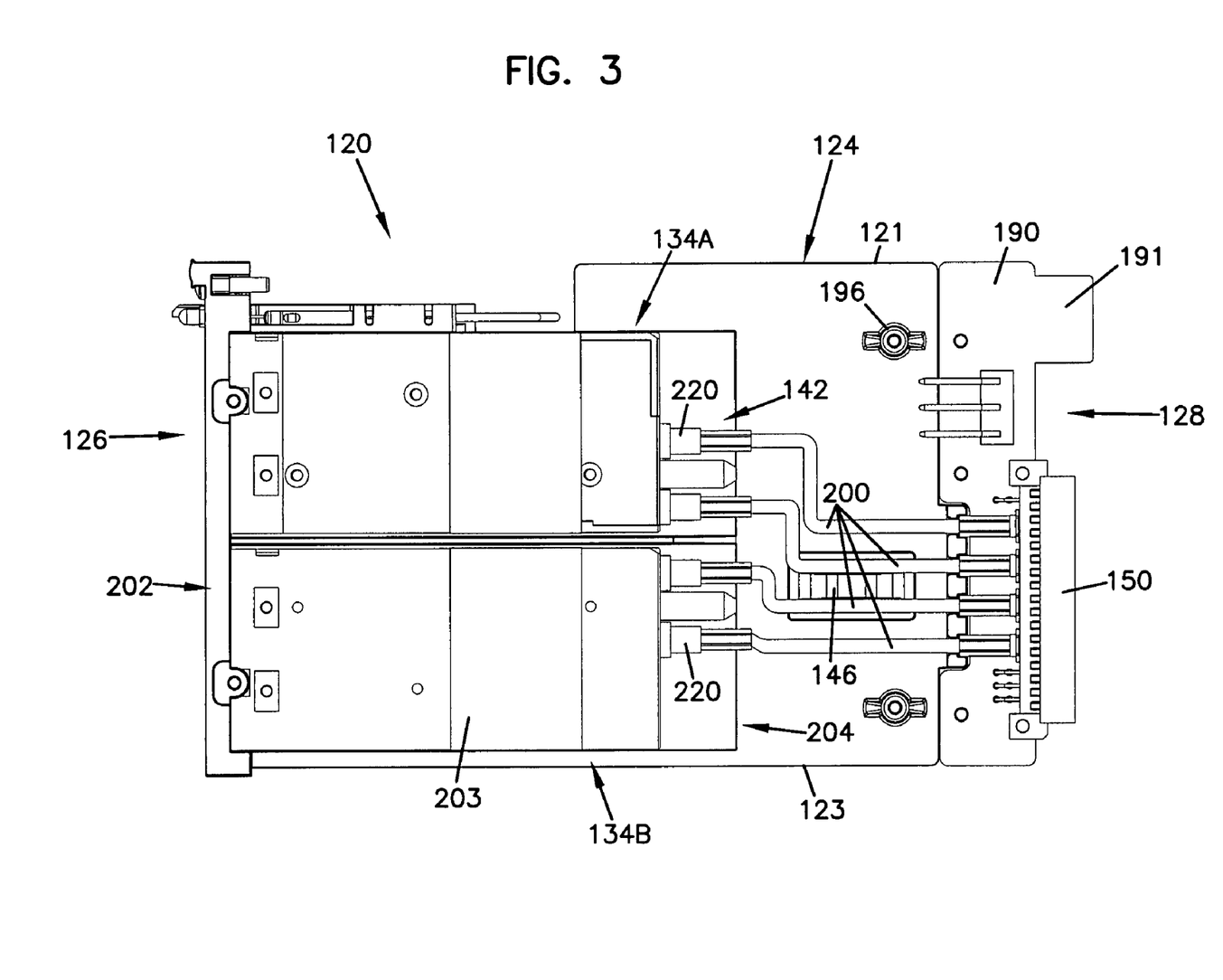
FIG. 3 shows a side view of the cross-connect module of FIG. 2, the module shown in a partially assembled configuration with the top cover removed.
Figure 4:
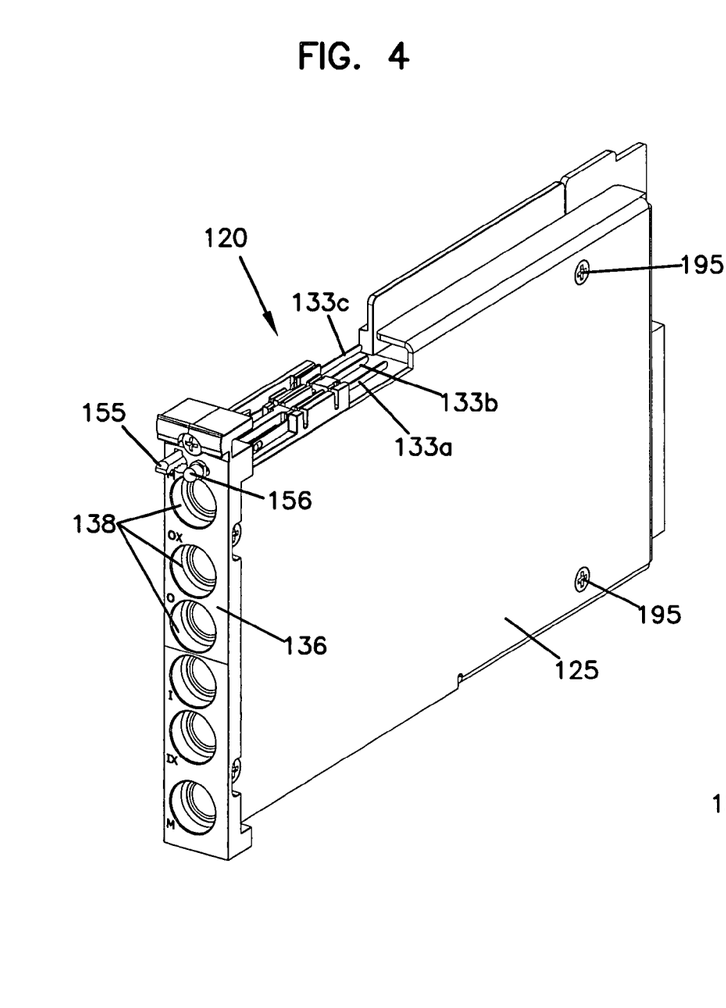
FIG. 4 shows a front perspective view of the cross-connect module of FIG. 2, the module shown fully assembled.
Figure 5:
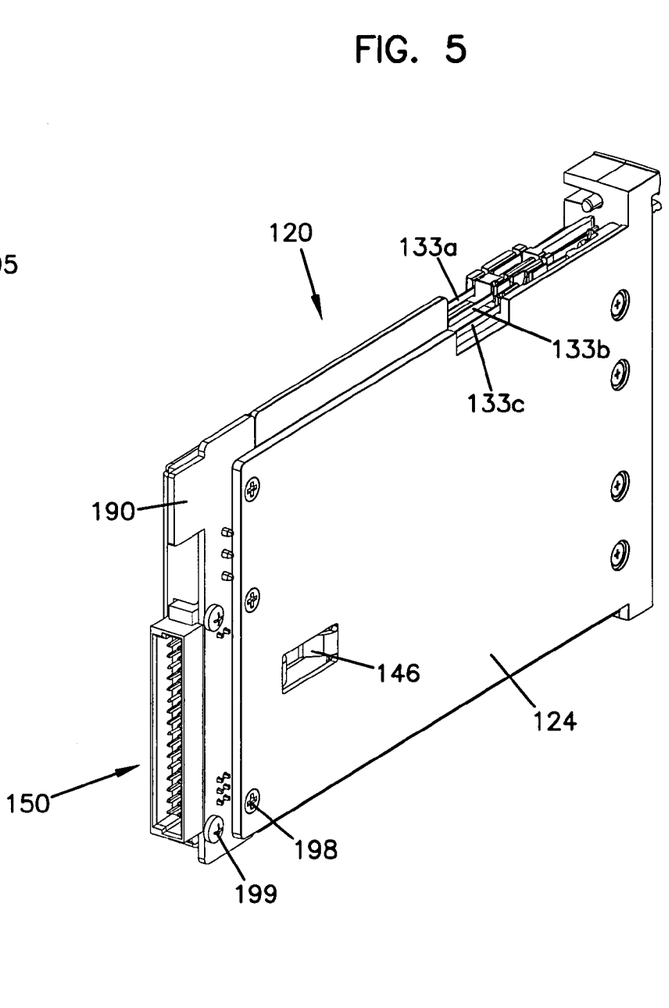
FIG. 5 shows a back perspective view of the cross-connect module of FIG. 2, the module shown fully assembled.
Figure 6:
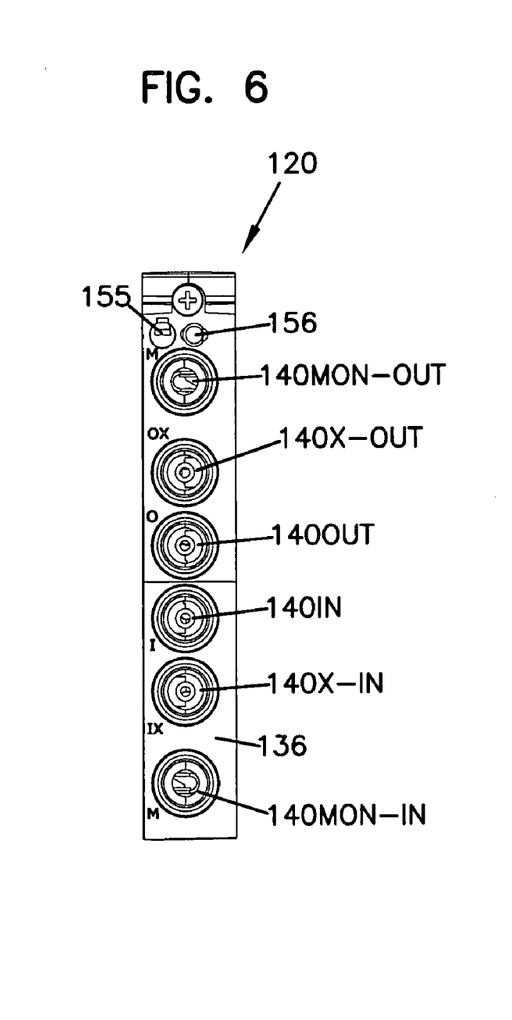
FIG. 6 shows a front view of the cross-connect module of FIG. 2.
Figure 7:
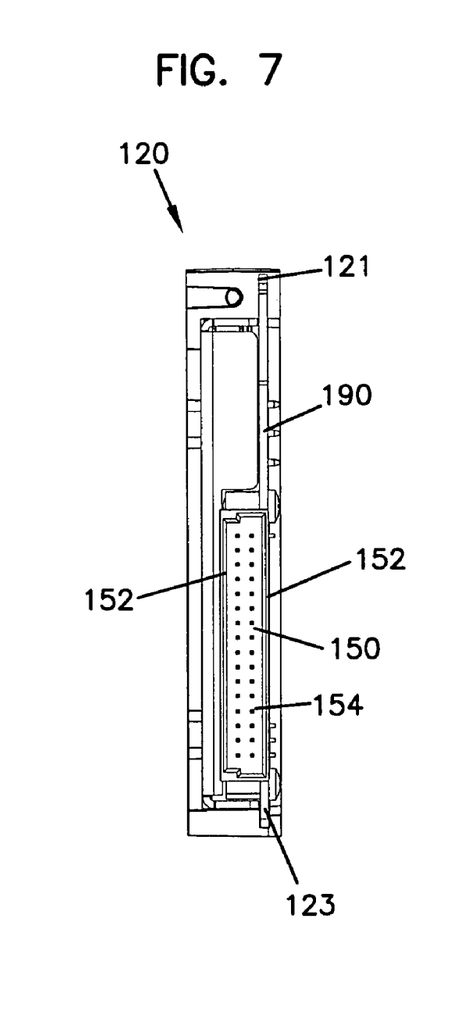
FIG. 7 shows a back view of the cross-connect module of FIG. 2.
Figure 8:
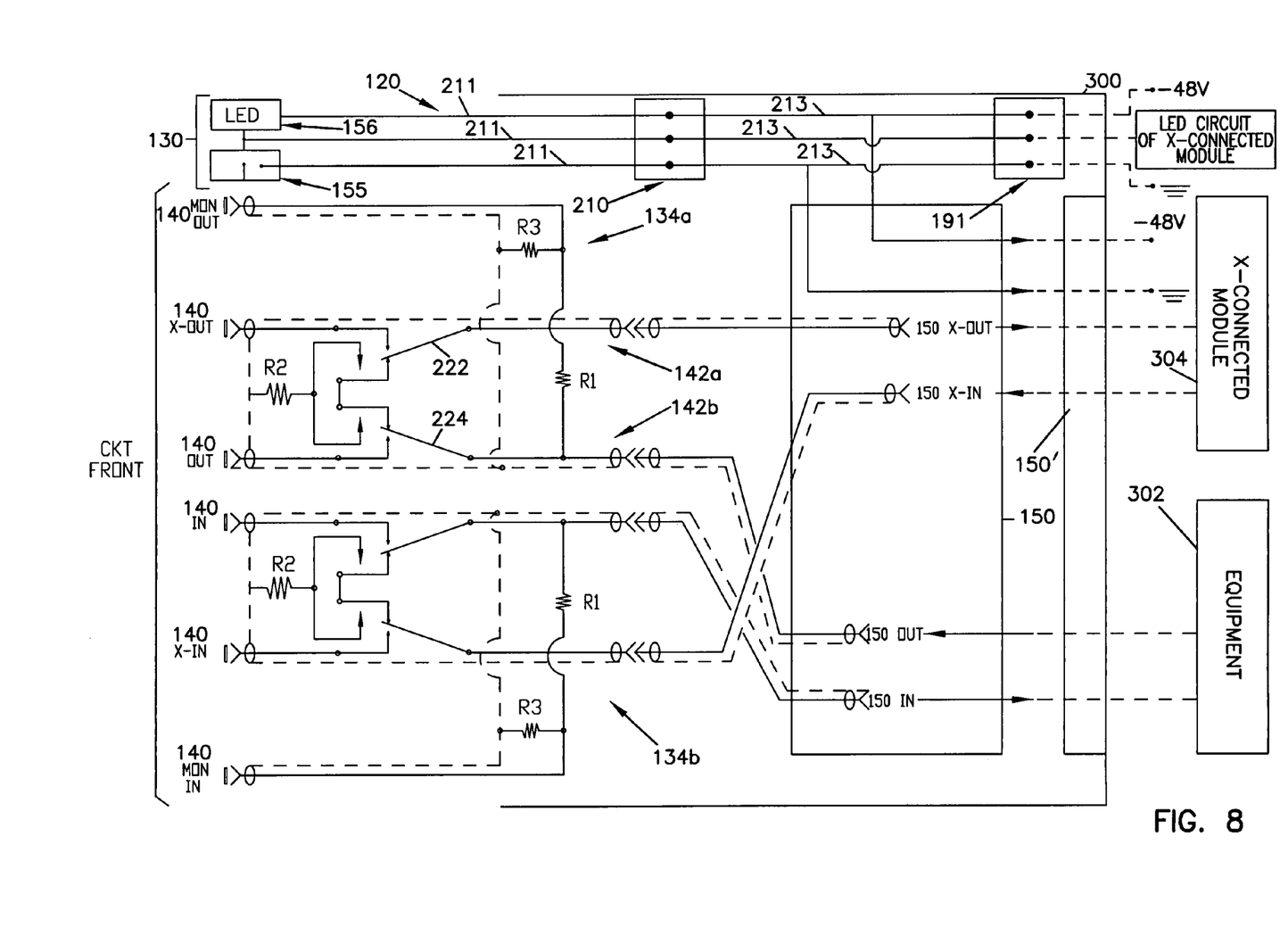
FIG. 8 is a schematic circuit diagram of the cross-connect module of FIG. 2.
Figure 9:
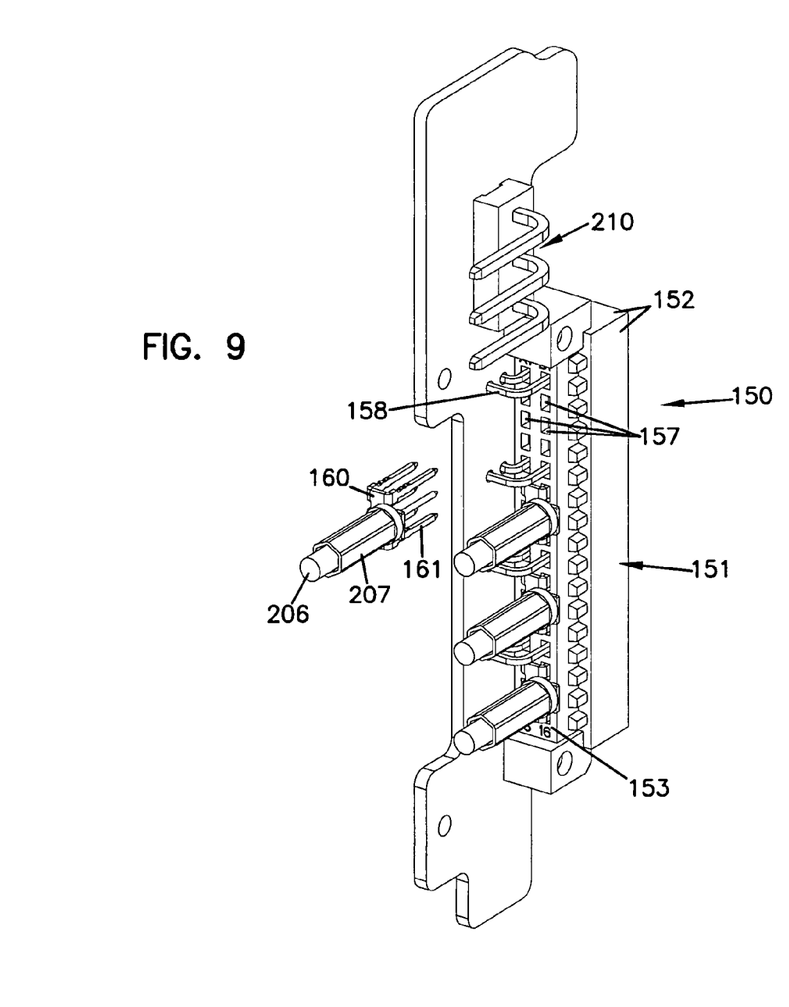
FIG. 9 shows a circuit board and a DIN-type rear connector mounted on the circuit board in isolation from the cross-connect module of FIG. 2.
Figure 10:
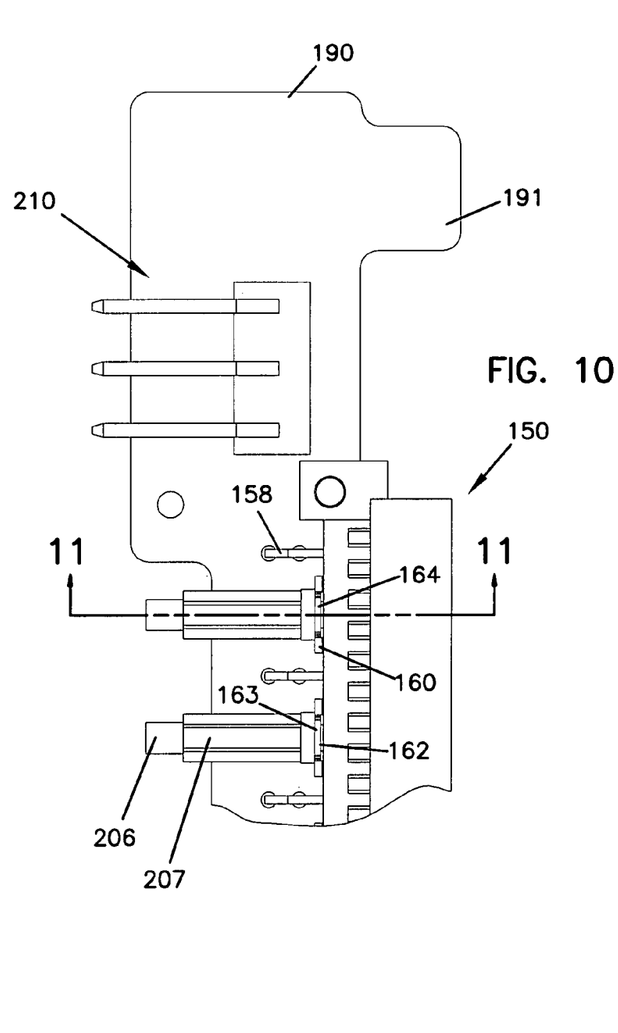
FIG. 10 shows a partial side view of the circuit board and the DIN-type rear connector of FIG. 9.

Referring to FIGS. 2, 3, and 8, the two jack devices 134*a*, 134*b* of the jack module preferably have identical configurations to promote manufacturing efficiency. However, jacks of different configurations could also be used.

Referring to FIGS. 2 and 3, each of the depicted jack devices 134*a*, 134*b* includes a jack housing 203 including a front end 202 and a rear end 204. In a non-limiting embodiment, the housing 203 can be made from die cast metal. The front ends 202 of the jack devices 134*a*, 134*b* define a monitor port 140MON-OUT or 140MON-IN, a cross-connect access port 140X-OUT or 140X-IN, and an equipment access port 140OUT or 140IN. The jack devices 134*a*, 134*b* are received within the pockets 132*a*, 132*b* defined in the main frame 124 of the module. Once mounted, the ports 140 of the jack devices 134*a*, 134*b* align with the corresponding connector openings 138 of the front face 136 of the main frame 124.

Each jack device 134*a*, 134*b* includes switches and other circuit components positioned between the front end 202 and the rear end 204 housed within the housing 203. The rear end 204 includes cable termination structures 220 that define connectors 142. Cables 200 electrically couple the connectors 142 to the rear connector 150.

FIG. 8 shows a schematic switch configuration for the jack devices 134*a*, 134*b* of the cross-connect module 120. Referring to the schematic for jack device 134*a*, for example, when no plug is inserted within any of the ports 140, connectors 142*a* and 142*b* are electrically connected by springs 222 and 224. When a plug is inserted into port 140X-OUT, for example, the electrical connection between the connectors 142*a* and 142*b* is broken and a direct electrical connection is provided between port 140X-OUT and the connector 142*a*. Concurrently, the center pin of the connector 142*b* is grounded. When a plug is inserted into port 140OUT, for example, the electrical connection between connectors 142*a* and 142*b* is broken and a direct electrical connection is provided between port 140OUT and connector 142*b*. In this configuration, the center pin of the connector 142*a* is electrically connected to ground. The port 140MON-OUT, for example, allows signals being transferred through the jack device to be non-intrusively monitored. The switching circuitry of jack device 134*b* operates in the same manner as the switching circuitry of the jack device 134*a*.

III. Tracer Lamp Circuitry and Printed Circuit Board

Referring to FIGS. 2 and 8, the jack module 120 is preferably equipped with tracer lamp circuitry 130. The tracer lamp circuitry 130 includes a tracer lamp such as a light emitting diode (LED) 156 mounted at the front face 136 of the main frame 124. A tracer lamp switch 155 is positioned adjacent the LED 156. The tracer lamp circuit also includes contact springs 133*a*, 133*b*, and 133*c* (shown in FIG. 2) that are press fit within slots 135 defined by a spring mount 139 that is located adjacent the top front corner of the module 120. The contact springs 133*a*, 133*b*, and 133*c* are electrically connected to the PCB connector 210 that is mounted to the circuit board at the rear end 128 of the main frame 124 (e.g., via wires 211 shown at FIG. 8). As previously described, tracings 213 of the circuit board connect the PCB connector 210 to the connector 191 and/or provide power and ground for the connector 150.

Card edge connector 191 is adapted to be connected with a power bus of the chassis 300 when the module is inserted into the chassis 300.

Referring to FIG. 2, when the LED 156 is inserted within the opening 137 in the front face 136 of the main frame 124, leads 180 of the LED make contact with the springs 133*a* and 133*b*. Contact spring 133*a* is also depicted to house an LED flashing arrangement that may include a capacitor, a resistor, and a flashing control circuitry including an integrated circuit (IC) or other means for controlling flashing of the lens. A flashing circuitry is optional and can also have a variety of configurations known in the art. An example LED flashing arrangement is described in U.S. patent application Ser. No. 10/879,893 entitled PRESS-IN-PLACE LED FOR A DIGITAL SWITCHING CROSS-CONNECT MODULE, assigned to ADC Telecommunications, Inc., the entire disclosure of which is incorporated herein by reference.

FIG. 8 schematically shows the tracer lamp circuit of the jack module 120. When the switch 155 is closed, the LED 156 is electrically connected to ground and thereby illuminated. The LED of the module to which the depicted module is cross-connected is also illuminated by closing the switch 155. Thus, by closing one switch 155, two jack modules that are cross-connected can easily be identified by merely locating the illuminated tracer lamps. An example tracer lamp circuit is described in U.S. Pat. No. 6,830,486, assigned to ADC Telecommunications, Inc., the entire disclosure of which is incorporated herein by reference.

IV. Schematic Circuit Arrangement

FIG. 8 shows the module 120 with the connector 150 mated with a corresponding connector 150' provided at the backplane of a chassis 300 that houses the module 120. By interfacing with the backplane of the chassis (e.g., through connectors 150, 150'), the module is connected to equipment 302 and is also cross-connected to another module 304. Also, the connector 191 interconnects the tracer light circuitry to corresponding tracer light circuitry of the module 304, and also connects the tracer light circuitry to power and ground.

V. Rear Connector and Cable Termination

The rear connector 150 of the module 120 is depicted as a DIN-type connector (i.e., Eurocard right angle connector). The rear connector 150 includes an elongated housing 151 having a backwall 153 and sidewalls 152 that define an interior space 154. The housing 151 defines a plurality of openings 157 in the backwall 153 that extend through the backwall 153 to the interior space 154. L-shaped prongs 158 extend between the circuit board 190 and the openings 157 of the rear connector housing 151. The L-shaped prongs 158 are conductive and can be used to establish electrical connection between the circuit board connector 210 and the rear connector 150 (e.g., for power and ground and/or for tracer light connections) through the circuit board 190.

Co-axial cables 200 are routed from the jack devices 134a, 134b directly to the rear connector 150. Referring to FIGS. 2, and 9–11, cable termination at the rear connector 150 is provided through a conductive plate 160 structure that includes a plurality of conductive prongs 161 that are inserted into the openings 157 of the connector 150 to form connection pins of the rear connector 150. The plate 160 includes a front face 162, a back face 163, and a hole 164 extending from the front face 162 to the back face 163. The prongs 161 extend forwardly from the front face 162 of the plate 160 and are spaced apart from each other such that they align with the openings 157 of the rear connector 150.

The cable 200 is connected to the plate 160 through a barrel member 170 (shown in FIG. 2) that is mounted at the back face 163 of the plate 160. The barrel 170 is generally of elongated shape and is hollow. The barrel 170 includes a front end 171 and a back end 172. The barrel 170 is mechanically coupled to the plate 160 by inserting the front end 171 of the barrel 170 through the hole 164 in the plate 160 and flattening or rolling the front portion 171 of the barrel 170 against the front face 162 of the plate 160 to form an annular retaining flange 171' (see FIG. 11). The barrel 170 is conductive and is electrically connected to the prongs 161 of the plate 160.

Figure 11:
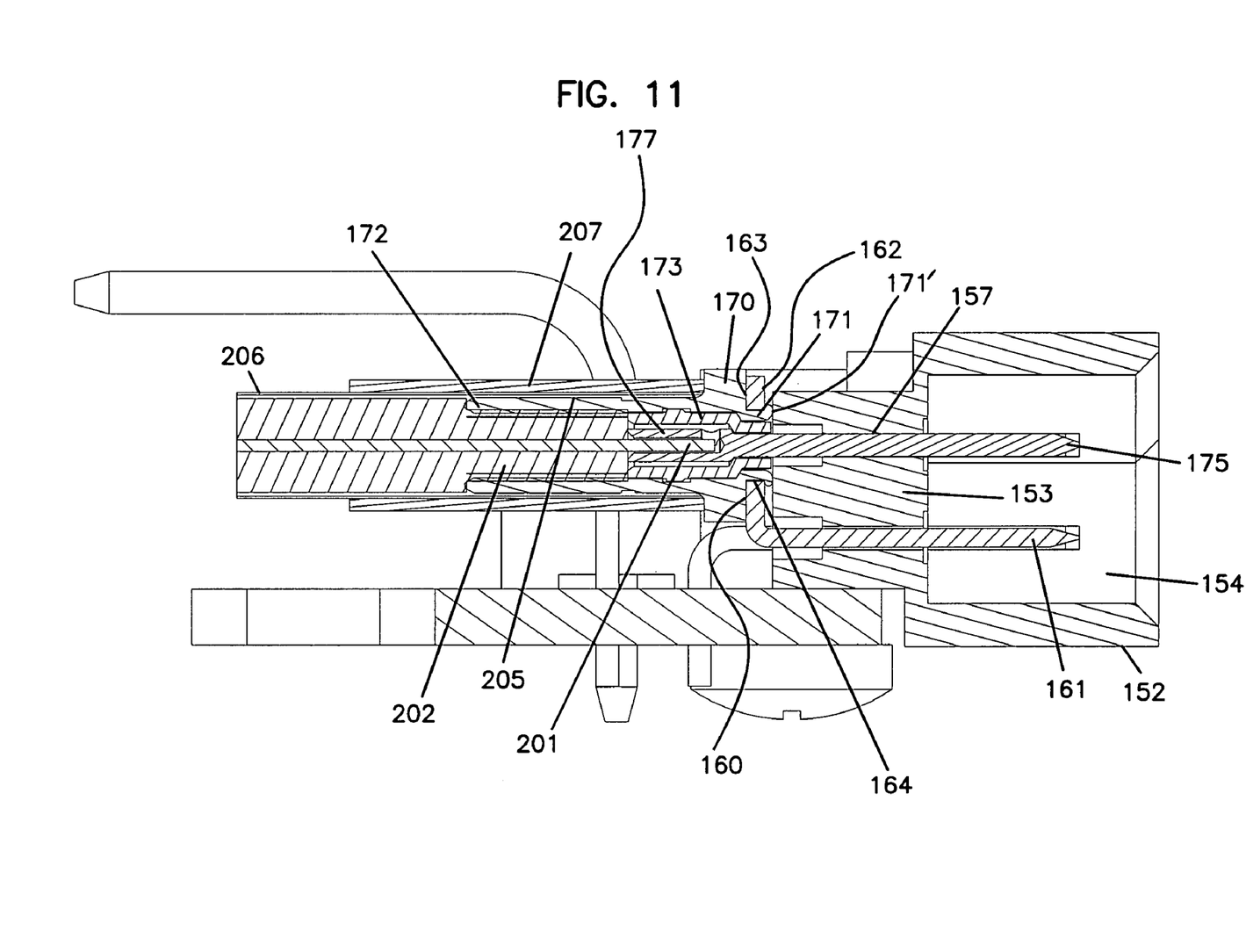
FIG. 11 illustrates a cross sectional view taken along line 11—11 of FIG. 10, showing the termination of a co-axial cable to the DIN-type rear connector.

To terminate the cable 200 to the barrel 170, the cable 200 is preferably stripped as shown in FIGS. 2 and 11. In the stripped configuration, the cable includes an exposed central conductor 201, a cladding portion 202 surrounding the central conductor 201, an outer conductive shield 205 surrounding the cladding portion 202, and an outer insulating jacket 206 surrounding the shield 205.

Referring to FIG. 11, a pin insulator or spacer 173 is fitted within the hollow barrel 170. A conductive center pin 175 is fitted within the spacer 173 such that the conductive center pin 175 extends through the barrel 170 and out the hole 164 in the plate 160. Preferably, the center pin 175 extends as far as the prongs 161 of the plate 160 and is configured to also form a connection pin of the rear connector 150. The central conductor 201 of the coaxial cable 200 is crimped to the center pin 175 by crimp 177. The outer conductive shield 205 overlaps and is crimped to the barrel 170 by a crimping ferrule 207. As mentioned earlier, the barrel 170 is electrically connected to the prongs 161 of the plate 160. The prongs 161 are used to ground the outer conductive shield 205 of the coaxial cable 200 while the central pin 175 is insulated from the barrel 170 by the spacer 173.

The front ends of the coaxial cable 200 are terminated at the termination structures 220 of the jacks 134a, 134b.

VI. Alternative Configurations

The embodiment of FIGS. 1–11 is depicted as a six-port module. It will be appreciated that the inventive aspects of the present disclosure are also applicable to modules having other number of ports (e.g., three-port and four-port modules). Moreover, connectors in accordance with the disclosure can be used in other environments in addition to the cross-connect environment disclosed herein.

The modules described herein are adapted for use in a coaxial system. Therefore, the various connectors and ports are adapted for use with coaxial connectors and plugs. However, it will be appreciated that the various inventive aspects are applicable to other types of connector configurations as well. It will be appreciated that many embodiments of the inventive aspects can be made without departing from the spirit and scope of the inventive aspects.

We claim:

1. A termination arrangement for terminating a co-axial cable to a DIN connector, the co-axial cable having a center conductor and a shield, the DIN connector including a rectangular DIN connector housing having an open interior region accessible from a front side of the DIN connector housing and rear wall positioned at a rear side of the DIN connector housing, the termination arrangement comprising:

a barrel positioned behind the rear wall of the DIN connector housing, the barrel defining an inner surface and an outer surface, the inner surface defining an inner passage of the barrel, the shield of the co-axial cable being terminated to the outer surface of the barrel and the center conductor of the co-axial cable extending into the inner passage of the barrel;

a grounding pin electrically connected to the barrel, the grounding pin including a portion that extends through the rear wall of the DIN connector housing and into the open interior region of the DIN connector housing;

a center conductor pin having a first portion positioned within the inner passage of the barrel and terminated to the center conductor of the co-axial cable, and a second portion that extends through the rear wall of the DIN connector housing and into the open interior region of the DIN connector housing; and a dielectric spacer positioned within the inner passage of the barrel for electrically isolating the center conductor pin from the barrel.

2. The termination arrangement of claim 1, further comprising a plate defining an opening at which a front end of the barrel is mechanically secured.

3. The termination arrangement of claim 2, wherein the front end of the barrel is flared outwardly to mechanically secure the front end of the barrel within the opening of the plate.

4. The termination arrangement of claim 2, wherein the grounding pin has a rear end that is integral with the plate.

5. The termination arrangement of claim 2, further comprising a plurality of forwardly projecting pins having rear ends integrally connected with the plate.

6. The termination arrangement of claim 1, wherein the first portion of the center conductor pin includes a crimp.

7. The termination arrangement of claim 1, further comprising a crimp for terminating the shield of the co-axial cable to the outer surface of the barrel.

8. A cross-connect module comprising:
a module housing having a front end and a rear end;
a plurality of switching devices positioned adjacent the front end of the module housing;
a connector mounted adjacent the rear end of the module housing, the rear connector electrically coupled to the plurality of switching devices via cables, each of the cables including a center conductor and a shield, the rear connector having an elongated connector housing with a backwall and sidewalls defining an interior space;
an electrically conductive barrel positioned adjacent the backwall of the rear connector, the barrel defining an inner surface and an outer surface, the inner surface defining an inner passage of the barrel, the shield of the cable being terminated to the outer surface of the barrel and the center conductor of the cable extending into the inner passage of the barrel, the barrel electrically connected to a grounding pin that extends through the backwall of the connector housing into the interior space, the barrel also electrically isolated from a center conductor pin that is positioned within the interior passage of the barrel, the center conductor pin being terminated to the center conductor of the cable and extending through the backwall of the connector housing into the interior space; and
a tracer lamp circuitry for identifying two switching devices that are cross-connected to each other, the tracer lamp circuitry electrically connected to the rear connector.

9. A cross-connect module according to claim 8, wherein a dielectric spacer positioned within the inner passage of the barrel electrically isolates the center conductor pin from the barrel.

10. A cross-connect module according to claim 8, wherein the module includes a circuit board coupled to the rear end of the module housing, the circuit board mechanically supporting the rear connector and providing an electrical connection between the tracer lamp circuitry and the rear connector.

11. A cross-connect module according to claim 8, wherein the cables that electrically couple the rear connector to the switching devices are co-axial cables.

12. A cross-connect module according to claim 8, wherein the rear connector is a DIN type connector.

13. A cross-connect module according to claim 8, wherein a portion of the center conductor pin includes a crimp.

14. A method of connecting a co-axial cable having a center conductor and a shield to a connector including a rectangular housing having a backwall and sidewalls defining an interior space, the method comprising the steps of:
(a) positioning a conductive barrel adjacent the backwall of the connector housing, the barrel electrically connected to a grounding pin that extends through the backwall of the connector housing into the interior space, the barrel defining an inner surface and an outer surface, the inner surface defining an inner passage of the barrel;
(b) providing a center conductor pin having a first portion positioned within the inner passage of the barrel and a second portion that extends through the backwall of the connector housing into the interior space;
(c) terminating the shield of the cable to the outer surface of the barrel and terminating the center conductor of the co-axial cable to the center conductor pin within the inner passage of the barrel, the center conductor pin being electrically isolated from the barrel by a spacer that is positioned within the interior passage of the barrel; and
(d) providing a grounding pin electrically connected to the barrel, the grounding pin including a portion that extends through the backwall of the connector housing into the interior space.

15. A method according to claim 14, further comprising the step of providing a conductive plate defining an opening at which the front end of the barrel is mechanically secured.

16. A method according to claim 15, wherein the conductive plate includes a forwardly projecting pin defining the grounding pin, the grounding pin having a rear end integrally connected with the plate.

17. A method according to claim 15, further comprising the step of flaring the front end of the barrel outwardly to mechanically secure the front end of the barrel within the opening of the plate.

18. A method according to claim 14, wherein the connector is a DIN type connector.

19. A method according to claim 14, wherein the first portion of the center conductor pin includes a crimp and wherein the termination of the shield of the co-axial cable to the outer surface of the barrel includes a crimp.

20. A method according to claim 14, wherein the co-axial cable connects the connector to a switching device located on a cross-connect module, the cross-connect module also including a tracer lamp circuit for identifying two switching devices that are cross-connected to each other, the tracer lamp circuitry electrically connected to the connector.

* * * * *